United States Patent [19]

Amano et al.

[11] Patent Number: 5,286,796
[45] Date of Patent: Feb. 15, 1994

[54] METHOD FOR THE PREPARATION OF POLYVINYL CHLORIDE RESIN

[75] Inventors: Tadashi Amano; Ichiro Kaneko, both of Ibaraki, Japan

[73] Assignee: Shin-Etsu Chemical Co., Ltd., Tokyo, Japan

[21] Appl. No.: 936,601

[22] Filed: Aug. 27, 1992

[30] Foreign Application Priority Data

Sep. 6, 1991 [JP] Japan ................... 3-254462

[51] Int. Cl.$^5$ ............................................. C08F 2/20
[52] U.S. Cl. ..................................... 526/200; 526/202
[58] Field of Search ................................ 526/200, 202

[56] References Cited

U.S. PATENT DOCUMENTS 4,845,174  7/1989  Amano ................................ 526/62
5,153,284 10/1992  Amano ............................... 526/200

Primary Examiner—Christopher Henderson
Attorney, Agent, or Firm—McAulay Fisher Nissen Goldberg & Kiel

[57] ABSTRACT

An improvement is proposed in the suspension polymerization of vinyl chloride monomer in order to obtain a polyvinyl chloride resin powder having good absorptivity of plasticizers by virtue of the well developed porosity of the resin particles and containing a decreased amount of fish eyes. The improvement comprises adding, to the polymerization mixture, a water-insoluble partially saponified polyvinyl acetate having an average degree of polymerization of at least 1000 and a degree of saponification of 20 to 60% in combination with a conventional water-soluble polymer as the suspending agent such as water-soluble partially saponified polyvinyl acetates and water-soluble cellulose ethers.

5 Claims, No Drawings

METHOD FOR THE PREPARATION OF POLYVINYL CHLORIDE RESIN

BACKGROUND OF THE INVENTION

The present invention relates to an improvement in the preparation of a polyvinyl chloride resin by the suspension polymerization of vinyl chloride monomer in an aqueous medium or, more particularly, to an improvement in the preparation of a polyvinyl chloride resin having well developed porosity of the resin particles to exhibit good plasticizer absorptivity and containing a greatly decreased amount of fish eyes by the suspension polymerization of vinyl chloride monomer in an aqueous medium.

Various proposals and attempts have been made heretofore relative to the method for the preparation of a polyvinyl chloride resin having good workability in resin molding and containing a decreased amount of fish eyes by the suspension polymerization of vinyl chloride monomer in an aqueous suspension medium. For example, Japanese Patent Kokai 52-5886, 52-110797, 52-115890, 55-112210 and 53-6392 and Japanese Patent Publication 61-18562 each propose a method in which a partially saponified polyvinyl acetate of a low degree of saponification of, e.g., 55% or lower, and a low average degree of polymerization of, e.g., 600 or lower, which is also called an oil-soluble polyvinyl alcohol, is used as a dispersing agent of the monomer so that the polyvinyl chloride resin obtained thereby has well developed porosity to exhibit improved workability and contains a greatly decreased amount of unreacted residual monomer absorbed in the resin particles.

The above described prior art method is indeed effective at least to some extent in increasing the porosity of the resin particles but a disadvantage is unavoidable therein that the bulk density of the resin powder is more or less decreased. When the amount of the so-called oil-soluble polyvinyl alcohol is increased with an object to further increase the porosity of the resin particles, in particular, an adverse influence is caused on the stability of the suspension resulting in occurrence of coarse particles in the resin product which may eventually contain agglomerates of resin particles along with a problem of an increase in the amount of polymer scale deposited on the walls of the polymerization reactor.

SUMMARY OF THE INVENTION

The present invention accordingly has an object to provide an improvement in the method for the preparation of a polyvinyl chloride resin powder by the suspension polymerization of vinyl chloride monomer in an aqueous suspension medium, by which a polyvinyl chloride resin powder having a high bulk density with a well developed porosity of the particles can be obtained without affecting the stability of the suspension and with a decreased amount of polymer scale deposition on the reactor walls.

Thus, the present invention provides an improvement which comprises, in the method for the preparation of a polyvinyl chloride resin by the suspension polymerization of vinyl chloride monomer in an aqueous polymerization mixture consisting of an aqueous suspension medium containing a water-soluble polymer as a suspending agent or protective colloid and droplets of the monomer suspended in the suspension medium in the presence of a monomer-soluble polymerization initiator, adding, to the polymerization mixture, a partially saponified polyvinyl acetate having a degree of saponification not exceeding 60% and an average degree of polymerization of at least 1000.

In particular, the above mentioned partially saponified polyvinyl acetate should preferably have an average degree of polymerization in the range from 2000 to 30,000.

Further, the above mentioned water-soluble polymer as the suspending agent contained in the aqueous suspension medium is preferably a partially saponified polyvinyl acetate having a degree of saponification in the range from 75 to 99% and an average degree of polymerization in the range from 1500 to 2700, a hydroxyproply methyl cellulose, of which the degree of substitution with methoxy groups is in the range from 26 to 30% by weight, the degree of substitution with hydroxypropoxy groups is in the range from 4 to 15% by weight and a 2% by weight aqueous solution has a viscosity in the range from 5 to 4000 centipoise at 20° C., or a combination thereof.

DETAILED DESCRIPTION OF THE PREFERRED EMBODIMENTS

As is described above, the most characteristic feature of the invention consists in the addition of a specific partially saponified polyvinyl acetate to the polymerization mixture, which serves as a dispersion stabilizing agent. It is essential that the partially saponified polyvinyl acetate has a degree of saponification not exceeding 60% or, preferably, in the range from 20 to 60% and an average degree of polymerization of at least 1000 or, preferably, in the range from 2000 to 30,000. When the degree of saponification of the partially saponified polyvinyl acetate is too high, the desired increasing effect on the porosity of the resin particles cannot be fully exhibited resulting in a decrease of the improvement in the plasticizer absorptivity and content of fish eyes in the resin powder. When the degree of saponification is too low, the suspension of the polymerization mixture cannot be fully stabilized to cause occurrence of coarser resin particles or broadening of the particle size distribution. When the average degree of polymerization is too high, on the other hand, the partially saponified polyvinyl acetate is poorly dispersible in the polymerization mixture so that the desired improving effect on the porosity of the resin particles would be decreased.

The amount of this partially saponified polyvinyl acetate added to the polymerization mixture is usually in the range from 0.002 to 5 parts by weight or, preferably, from 0.002 to 0.2 part by weight per 100 parts by weight of the vinyl chloride monomer in the polymerization mixture although the exact amount thereof should be selected depending on the desired porosity of the polyvinyl chloride resin particles. Since the partially saponified polyvinyl acetate defined above is insoluble in water, it cannot be introduced into the polymerization mixture in the form of an aqueous solution. Accordingly, it is introduced into the polymerization mixture as dispersed in water or as dissolved or dispersed in an organic solvent such as alcohols and ketones, e.g., acetone and methyl ethyl ketone. A preferably way of introduction thereof in the form of a powder is that the powder is swelled with an organic solvent and the thus swollen particles are introduced into the polymerization mixture either as such or after dispersing in water to give an aqueous dispersion by using a suitable agitating machine or homogenizer. The water-insoluble partially saponified polyvinyl acetate can be introduced into the polymerization mixture at any moment prior to the start of the polymerization reaction.

The aqueous suspension medium of the polymerization mixture contains a water-soluble polymer as the suspending agent or protective colloid for the monomer droplets. Preferable water-soluble polymers as the suspending agent include a partially saponified polyvinyl acetate having a degree of saponification in the range from 75 to 99% and an average degree of polymerization in the range from 1500 to 2700 and a hydroxypropyl methyl cellulose of which the degree of substitution with methoxy groups is in the range from 26 to 30% by weight, the degree of substitution with hydroxypropoxy groups is in the range from 4 to 15% by weight and a 2% by weight aqueous solution has a viscosity in the range from 5 to 4000 centipoise at 20° C. These water-soluble polymers can be used in combination of two kinds or more according to need. The advantage of the improvement obtained according to the invention is particularly remarkable when the water-soluble polymer is selected from the polymers of the above described classes.

When the average degree of polymerization of the above mentioned water-soluble partially saponified polyvinyl acetate is too low or the degree of saponification thereof is too low, the polyvinyl chloride resin powder as the product has a somewhat decreased bulk density in addition to the problem that the amount of polymer scale deposition on the reactor walls is increased when it is used in combination with the water-insoluble partially saponified polyvinyl acetate. When the average degree of polymerization or degree of saponification thereof is too high, on the other hand, the porosity of the polyvinyl chloride resin particles is decreased along with an increase in the content of fish eyes in the resin product.

When the hydroxypropyl methyl cellulose has a degree of substitution with methoxy groups or the degree of substitution with hydroxypropoxy groups lower than the above mentioned respective lower limits, the porosity of the polyvinyl chloride resin particles is decreased. When either of the degrees of substitution is too high, on the other hand, the polyvinyl chloride resin powder would have a somewhat broadened particle size distribution.

The amount of the above described water-soluble polymers either alone or in combination as dissolved in the aqueous suspension medium is preferably in the range from 0.005 to 0.1 part by weight per 100 parts by weight of the monomer in the polymerization mixture.

It is optional that the polymerization mixture further contains one or more of water-soluble or water-insoluble dispersion aids conventionally used in the suspension polymerization of vinyl chloride. Examples of such dispersion aids include water-soluble polymers such as water-soluble starch ethers, salts of polyacrylic acid, gelatin and the like, oil-soluble surface active agents such as sorbitan monolaurate, sorbitan trioleate, sorbitan monostearate, glycerin tristearate, block copolymers of ethylene oxide and propylene oxide and the like and water-soluble surface active agents such as sodium dodecylbenzene sulfonate, polyoxyethylene sorbitan monolaurate, polyoxyethylene glycerin oleate, sodium laurate and the like as well as certain inorganic powders such as calcium carbonate, calcium phosphate and the like either alone or in combination.

The improvement according to the invention can be obtained not only in the homopolymerization of vinyl chloride monomer alone but also in the copolymerization of vinyl chloride monomer with one or more of other monomers copolymerizable with vinyl chloride provided that the principal component or at least 50% by weight of the monomer mixture is vinyl chloride. Examples of the comonomers copolymerizable with vinyl chloride include: α-olefins such as ethylene, propylene, 1-butene, 1-pentene, 1-hexene, 1-heptene, 1-octene, 1-nonene, 1-decene, 1-undecene, 1-dodecene, 1-tridecene, 1-tetradecene and the like; acrylic acid and esters thereof such as methyl acrylate and ethyl acrylate; methacrylic acid and esters thereof such as methyl methacrylate; maleic acid and esters thereof; vinyl esters such as vinyl acetate, vinyl propionate and the like; vinyl ethers such as lauryl vinyl ether, isobutyl vinyl ether and the like; maleic anhydride; acrylonitrile; styrene; vinylidene chloride and so on. These comonomers can be used either singly or as a combination of two kinds or more according to need.

The polymerization reaction of vinyl chloride monomer and the comonomers, if any, proceeds in the presence of a monomer-soluble polymerization initiator, which is exemplified by perester compounds such as tert-butylperoxy neodecanoate, tert-butylperoxy pivalate, tert-hexylperoxy pivalate, tert-hexylperoxy neodecanoate, α-cumylperoxy neodecanoate, tert-hexylperoxy neohexanoate, 2,4,4-trimethylpentyl-2-peroxy 2-neodecanoate and the like; percarbonate compounds such as diisopropylperoxy dicarbonate, di(2-ethylhexylperoxy) dicarbonate, di(2-ethoxyethylperoxy) dicarbonate, di(methoxyisopropylperoxy) dicarbonate and the like; peroxide compounds such as decanoyl peroxide, lauroyl peroxide, benzoyl peroxide, cumene hydroperoxide, cyclohexanone peroxide, 2,4-dichlorobenzoyl peroxide, 2,4,4-trimethylpentyl-2-peroxy phenoxy acetate, 3,5,5-trimethylhexanoyl peroxide, isobutyryl peroxide, acetyl cyclohexylsulfonyl peroxide and the like and azo compounds such as α,α'-azobisisobutyronitrile, α,α'-azobis(4-methoxy-2,4-dimethyl valeronitrile), α,α'-azobis(4-methoxy-2,4-dimethyl valeronitrile) and the like. These monomer-soluble polymerization initiators can be used either singly or as a combination of two kinds or more according to need. It is further optional to use a limited amount of a water-soluble polymerization initiator such as potassium persulfate, ammonium persulfate, hydrogen peroxide and the like in combination with the monomer-soluble polymerization initiator.

The polymerization reaction according to the invention can be performed in a conventional manner including the conditions such as the amount of the aqueous suspension medium, amount of the polymerization initiator and amount of the water-soluble suspending agent relative to the amount of the vinyl chloride monomer, the procedure for the introduction of these ingredients into the polymerization reactor, polymerization temperature and so on. It is of course optional that the polymerization mixture is admixed with various kinds of known additives conventionally used in the suspension polymerization of vinyl chloride monomer including polymerization regulators, chain transfer agents, pH controlling agents, gelation improvers, antistatic agents, scale deposition inhibitors and the like according to need each in a limited amount.

In the following, the improvement obtained according to the invention is illustrated in more detail by way of examples and comparative examples which, however, never limit the scope of the invention in any way.

EXAMPLE 1

Into a stainless steel polymerization reactor of 2000 liters capacity equipped with a stirrer and a jacket for cooling and heating media were introduced 950 kg of deionized water, 90 g of a water-soluble partially saponified polyvinyl acetate having an average degree of polymerization of 2550 and a degree of saponification of 80%, 90 g of a hydroxypropyl methyl cellulose of which the degrees of substitution with methoxy and hydroxypropoxy groups were 29% by weight and 9% by weight, respectively, and a 2% by weight aqueous solution had a viscosity of 50 centipoise at 20° C., 360 g of a water-insoluble partially saponified polyvinyl acetate having an average degree of polymerization of 3000 and a degree of saponification of 55% and 300 g of di(2-ethylhexylperoxy) dicarbonate to form a polymerization medium.

After evacuation of the polymerization reactor down to a pressure of 50 mmHg by using a vacuum pump, 600 kg of vinyl chloride monomer were introduced into the reactor and suspended in the polymerization medium under agitation to give a polymerization mixture. While continuing agitation, hot water was passed through the jacket of the reactor to heat the polymerization mixture in the reactor up to a polymerization temperature of 51° C. to start the polymerization reaction which was continued until the pressure inside the reactor had dropped to 5.0 kg/cm$^2$G. Then, the unreacted vinyl chloride monomer was purged out of the reactor to terminate the polymerization reaction and the slurry of the polyvinyl chloride resin was discharged out of the reactor, dehydrated and dried in a conventional manner to give a polyvinyl chloride resin product in the form of a powder. Almost no polymer scale deposition was found on the inner walls of the reactor after discharge of the polymerizate slurry.

The thus prepared polyvinyl chloride resin was evaluated by measuring the bulk density, particle size distribution, plasticizer absorption and content of fish eyes each in the procedure given below to give the results shown in Table 1.

Bulk density: Measurement was performed according to the procedure specified in JIS K 6721.

Particle size distribution: Measurement was performed according to the procedure specified in JIS Z 8801 to record the fractions of the powder in % by weight passing through screens of 60 meshes, 100 meshes and 200 meshes fineness.

Plasticizer absorption: A mass of glass fibers was put on the bottom of a cylindrical vessel of an aluminum alloy having an inner diameter of 25 mm and a depth of 85 mm and a 10 g portion of the resin powder was introduced into the vessel. Thereafter, the resin powder was wetted by adding 15 ml of dioctyl phthalate and kept standing for 30 minutes at room temperature to cause full absorption of the plasticizer. The unabsorbed portion of dioctyl phthalate was separated by centrifugation at an acceleration of 1500 G to determine the amount of the plasticizer absorbed by the resin powder which was recorded in % by weight based on the amount of the dry resin powder.

Content of fish eyes: A 25 g portion of a resin compound composed of 100 parts by weight of the resin powder, 1 part by weight of tribasic lead sulfate, 1.5 parts by weight of lead stearate, 0.2 part by weight of titanium dioxide, 0.1 part by weight of carbon black and 50 parts by weight of dioctyl phthalate was milled for 3 minutes on a roller mill kept at 145° C. and then sheeted into a sheet of 0.2 mm thickness, of which the number of translucent spots was counted on a 100 cm$^2$ wide area to be recorded as the number of fish eyes.

EXAMPLE 2

The experimental procedure was just the same as in Example 1 except that the water-insoluble partially saponified polyvinyl acetate having an average degree of polymerization of 3000 and a degree of saponification of 55% was replaced with the same amount of another partially saponified polyvinyl acetate having an average degree of polymerization of 8000 and a degree of saponification of 45%. Almost no polymer scale deposition was found on the inner walls of the reactor after discharge of the polymerizate slurry. The results of the evaluation tests of the polyvinyl chloride resin powder were as shown in Table 1.

EXAMPLE 3

The experimental procedure was just the same as in Example 1 except that 360 g of the water-insoluble partially saponified polyvinyl acetate was replaced with 420 g of another partially saponified polyvinyl acetate having an average degree of polymerization of 3000 and a degree of saponification of 55%. Almost no polymer scale deposition was found on the inner walls of the polymerization reactor after discharge of the polymerizate slurry. The results of the evaluation tests of the polyvinyl chloride resin powder were as shown in Table 1.

EXAMPLE 4

The experimental procedure was just the same as in Example 1 except that 90 g of the water-soluble partially saponified polyvinyl acetate having an average degree of polymerization of 2550 and degree of saponification of 80% were replaced with 300 g of another water-soluble partially saponified polyvinyl acetate having an average degree of polymerization of 780 and degree of saponification of 73% and the water-soluble cellulose ether was omitted. Almost no polymer scale deposition was found on the inner walls of the polymerization reactor after discharge of the polymerizate slurry. The results of the evaluation tests of the polyvinyl chloride resin powder were as shown in Table 1.

COMPARATIVE EXAMPLE 1

The experimental procedure was substantially the same as in Example 1 excepting replacement of the water-insoluble partially saponified polyvinyl acetate with the same amount of another partially saponified polyvinyl acetate having an average degree of polymerization of 250 and a degree of saponification of 50%. It was noted that an undue increase was caused in the consistency of the polymerizate slurry in the latest stage of the polymerization reaction so as to cause an increase in the temperature of the polymerization mixture by 3° C. due to decreased efficiency of heat removal. The inner walls of the polymerization reactor after discharge of the polymerizate slurry was found to have deposition of polymer scale on the area in contact with the liquid phase and the amount of the polymer scale deposition was large along the boundary line between the liquid and gaseous phases. Results of the evaluation tests of the resin powder were as shown in Table 1.

COMPARATIVE EXAMPLE 2

The experimental procedure was just the same as in Comparative Example 1 except that the amounts of the water-soluble partially saponified polyvinyl acetate and the water-soluble cellulose ether were each increased to 150 g. Polymer scale deposition was found on the inner walls of the polymerization reactor after discharge of the polymerizate slurry along the boundary line between the liquid and gaseous phases. Results of the evaluation tests of the polyvinyl chloride resin powder were as shown in Table 1.

COMPARATIVE EXAMPLE 3

The experimental procedure was substantially the same as in Example 4 excepting replacement of the water-insoluble partially saponified polyvinyl acetate with the same amount of another water-insoluble partially saponified polyvinyl acetate having an average degree of polymerization of 250 and a degree of saponification of 50%. The polymerization reaction, however, could not be continued to the end because of the undue increase in the torque on the stirrer resulting in a remarkable increase of the temperature of the polymerization mixture. The polymerizate slurry discharged out of the polymerization reactor contained a large amount of coarse particles.

COMPARATIVE EXAMPLE 4

The experimental procedure was the same as in Example 1 excepting omission of the water-insoluble partially saponified polyvinyl acetate. Polymer scale deposition was found on the inner walls of the polymerization reactor after discharge of the polymerizate slurry along the boundary line between the liquid and gaseous phases. Table 1 shows the results of the evaluation tests of the polyvinyl chloride resin powder which, however, contained a considerable amount of agglomerates of resin particles.

TABLE 1

| | Bulk density, g/cm$^3$ | Particle size distribution, % passing through screen of | | | Plasticizer absorption, % | Number of fish eyes /100 cm$^2$ |
|---|---|---|---|---|---|---|
| | | #60 | #100 | #200 | | |
| Example 1 | 0.515 | 100 | 69.5 | 1.0 | 35.2 | 5 |
| Example 2 | 0.510 | 100 | 72.8 | 1.1 | 34.3 | 6 |
| Example 3 | 0.520 | 100 | 75.1 | 1.5 | 33.6 | 10 |
| Example 4 | 0.498 | 100 | 58.9 | 0.6 | 35.6 | 3 |
| Comparative Example 1 | 0.457 | 98.6 | 25.1 | 0.5 | 34.9 | 58 |
| Comparative Example 2 | 0.462 | 100 | 51.2 | 0.8 | 31.5 | 87 |
| Comparative Example 4 | 0.412 | 89.2 | 46.5 | 3.4 | 29.5 | 100 |

What is claimed is:

1. In a method for the preparation of a polyvinyl chloride resin by the suspension polymerization of vinyl chloride monomer in an aqueous polymerization mixture consisting of an aqueous suspension medium containing a water-soluble polymer, which is a partially saponified polyvinyl acetate having a degree of saponification in the range from 75 to 99% and an average degree of polymerization in the range from 1500 to 2700, a hydroxypropyl methyl cellulose, of which the degree of substitution with methoxy groups is in the range from 26 to 30% by weight, the degree of substitution with hydroxypropoxy groups is in the range from 4 to 15% by weight and a 2% by weight aqueous solution has a viscosity in the range from 5 to 4000 centipoise at 20° C., or a combination thereof, as a suspending agent and droplets of the monomer suspended in the suspension medium in the presence of a monomer-soluble polymerization initiator, the improvement which comprises adding, to the polymerization mixture, a water-insoluble partially saponified polyvinyl acetate having a degree of saponification not exceeding 60% and an average degree of polymerization of at least 1000.

2. The improvement as claimed in claim 1 in which the water-insoluble partially saponified polyvinyl acetate has an average degree of polymerization in the range from 2000 to 30,000.

3. The improvement as claimed in claim 1 in which the water-insoluble partially saponified polyvinyl acetate has a degree of saponification in the range from 20% to 60%.

4. The improvement as claimed in claim 1 in which the amount of the water-insoluble partially saponified polyvinyl acetate is in the range from 0.002 to 5 parts by weight per 100 parts by weight of the monomer.

5. The improvement as claimed in claim 4 in which the amount of the water-insoluble partially saponified polyvinyl acetate is in the range from 0.002 to 0.2 part by weight per 100 parts by weight of the monomer.

* * * * *